April 21, 1931.  W. G. FLUHARTY  1,802,244
DUPLEX BALANCE INDICATOR
Filed Aug. 3, 1929  2 Sheets-Sheet 1
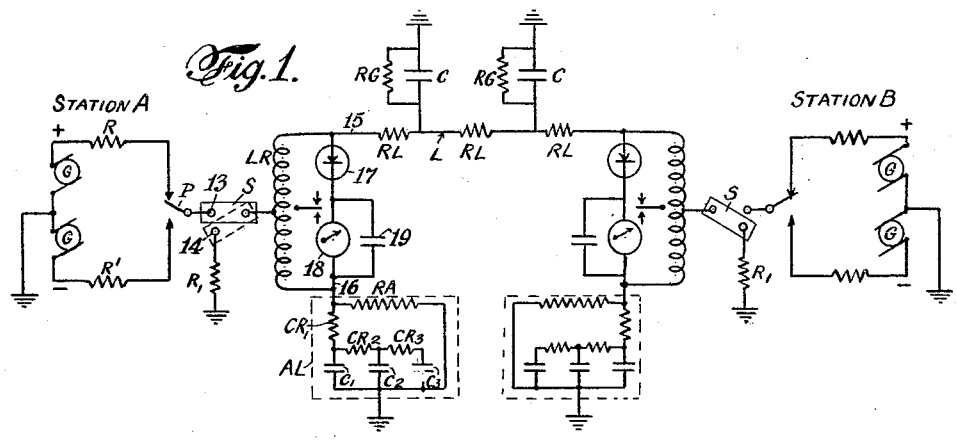

April 21, 1931. W. G. FLUHARTY 1,802,244
DUPLEX BALANCE INDICATOR
Filed Aug. 3, 1929    2 Sheets-Sheet 2
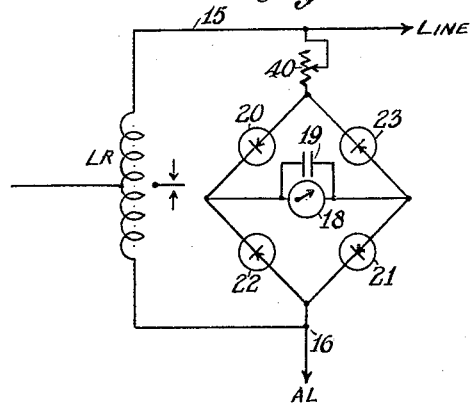
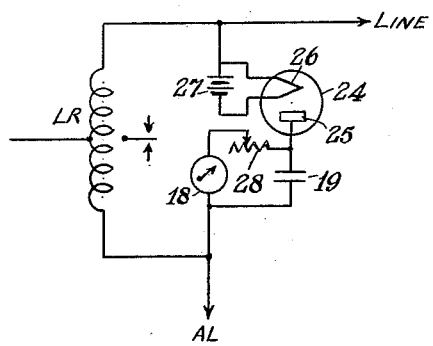
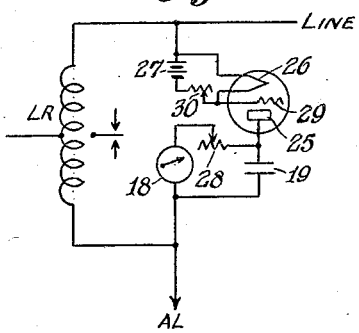
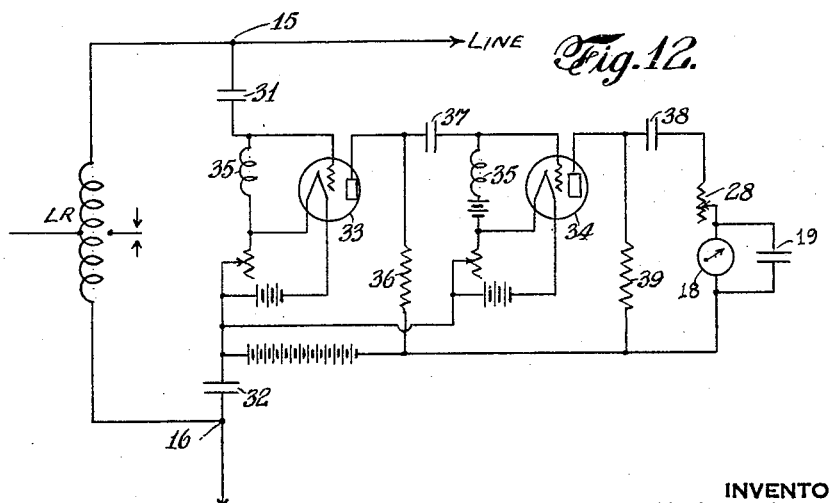
INVENTOR
*William G. Fluharty*
BY
ATTORNEY Patented Apr. 21, 1931

1,802,244

UNITED STATES PATENT OFFICE

WILLIAM G. FLUHARTY, OF ROCKVILLE CENTER, NEW YORK, ASSIGNOR TO THE WESTERN UNION TELEGRAPH COMPANY, OF NEW YORK, N. Y., A CORPORATION OF NEW YORK

DUPLEX BALANCE INDICATOR

Application filed August 3, 1929. Serial No. 383,343.

This invention relates to a duplex wire communicating system, such as the usual bridge or differential duplex telegraph system and more particularly to the balancing of the real line and the artificial line of such a system.

In duplex systems, as is well known, the artificial line must closely balance the real line for proper operation of the system at high speed, both as to resistance and capacity, as well as phase relationship, so that the electrical characteristics of the real and artificial lines will be substantially the same. The electrical characteristics of the real line vary over a wide range due to changes in weather and atmospheric conditions, and it is necessary to adjust the artificial line, from time to time, to maintain the correct balance. It is the usual practice to balance the line each day, ordinarily early in the morning when the traffic is light. However, at this time the atmosphere is likely to be damp and the transmission characteristics of the line quite different from that existing later in the day.

Due to the complicated nature of the problem, no suitable device has been available, heretofore, by which the degree of balance could be easily and accurately ascertained for guidance in making the adjustment of the artificial line, and since considerable time is required to make an accurate balance, it has not been thought feasible, ordinarily, to discontinue the operation of the line during the day, to rebalance.

The wave form commonly employed for telegraph transmission is not of regular sinusoidal form, and where voltage reversals are sent to the line, they usually start out as block signals, modified in shape due to the distributed capacity and other characteristics of the line.

A mathematical analysis of the square topped block wave has shown that it is composed of a considerable number of sine wave alternating currents of gradually increasing odd multiples of the fundamental frequency, with a gradual decrease in amplitude for all frequencies above the fundamental. It should be observed, therefore, that currents having frequencies several times that of the frequency at which the key is operated are transmitted over the line. In commercial telegraph systems the fundamental frequency may be as high as one hundred cycles or more in cases of automatic sending and reception by automatic printing machines, so that the accompanying harmonics are of relatively high frequency.

As a matter of fact, perfect block signals are not transmitted to the receiving station due to the impedance of the line. The line may be considered as having distributed resistance and inductance in series and distributed capacity and leak resistance in shunt. The impedance of the line presented by the inductance is greater with the higher frequencies while the impedance of the distributed capacity decreases with increased frequencies so that the inductance tends to suppress the high frequency currents and the shunt capacity to conduct them to ground, and thus remove the higher harmonics from the block signals. Since the higher harmonics give form to the block signal their partial removal causes a distortion of the signals.

From the above it can be seen that, as the signal frequency is increased and the length of the telegraph circuit increased, more and more of the component frequencies are suppressed until the received signals have very little of the shape of the block signal left.

In balancing the artificial line and the real line, the elements of the artificial line must be adjusted to simulate the loss of these higher frequency components. However, difficulty has been experienced, heretofore, in obtaining an accurate balance of the line since the instruments available for measuring the degree of unbalance, if sufficiently sensitive, have too large a moment of inertia, or power absorption to register these higher frequency currents, while the more rapid instruments are too low in sensitivity to register the weaker high frequency currents.

For instance, the usual alternating current meter placed across the real and artificial lines to indicate the unbalanced current is not capable of accurately registering the same since the sensitivity of such instruments is low for high frequency currents, and falls off as the amplitude of the reversals decrease. A direct current meter cannot be employed directly across the real and artificial lines since very little if any indication would be obtained with such instrument for the higher component frequencies on account of the damping and inertia of the instrument.

Attempts have been made to use ink writing recorders for indicating the degree of balance but such instruments are not sensitive to the higher frequencies and it is difficult for the eye to interpret these writings in degrees of unbalance.

Balancing of the line has, therefore, been a time consuming operation and the balance obtained not particularly accurate.

One of the objects of the present invention, is to provide a simple indicating means in the form of a direct current meter which will enable the amount of out-of-balance of the real and artificial lines to be accurately and quickly determined.

Another object is to provide a balance indicating means which is responsive to the high frequency components of the signals and which provides a positive determination of the degree of unbalance of the line.

A further object is to provide a direct reading instrument for determining the degree of unbalance of the line which will serve as a positive guide of procedure during the adjustment of the individual elements of the artificial line, and which will enable a more accurate simulation of the electrical characteristics of the real and artificial lines to be obtained.

Other objects and advantages will hereinafter appear:

In accordance with my invention I employ a damped direct current meter for reading the degree of unbalance of the line and provide the meter with a condenser in shunt thereto, the condenser and meter being connected between the real and artificial lines through a rectifier or asymmetric device which permits the unbalanced current to flow in one direction only to the instrument. The condenser will therefore receive a charge in proportion to the energy of both the high and low frequency currents, and a uni-potential will develop across the condenser, due to the current accumulation.

As the charge is trapped in the condenser by the rectifier, the condenser discharges through the meter as uni-potential direct current, and the meter reading indicates the energy of the unbalanced current, irrespective of the form of the input waves. A resistance or other means may be provided in series with the meter for regulating the rate of discharge, of the condenser through the meter.

I have found, when using apparatus of the above nature, that the meter indicates immediately the degree of out-of-balance, and moreover is directly responsive to each of the several elements of the artificial line so as to indicate whether they are individually adjusted to the proper value to duplicate, electrically, the characteristics of the real line.

The adjustment of each element of the artificial line, except in the obtaining of a very fine balance, is relatively independent of the adjustment of the remaining elements. In other words, the effect of each of the elements on the total unbalanced current is accumulative, and each element may be separately adjusted, in any order, to obtain a minimum meter reading. It is due to this ability, to adjust independently each of the artificial line elements, using the total meter reading as a guide, which enables quick and accurate balancing to be obtained.

In order that the invention may be more fully understood, reference will be had to the accompanying drawings in which:

Figure 1 illustrates the circuit arrangement of a simple duplex telegraph system showing a preferred embodiment of the invention applied thereto;

Figure 2 shows a curve representing the wave shape of the block signals which it is desired to transmit over the line.

Figure 3 shows the wave form of the signal reversals as actually transmitted to the line.

Figures 4 and 5 and 6 are curves representing the wave shape of the out-of-balance current due to improper adjustment of the first, second and third condensers, respectively, of the artificial line.

Figure 7 is a curve showing the wave shape of the total unbalanced current, due to improper adjustment of all of the condensers of the artificial line.

Figure 8 shows the wave shape of the out-of-balance current, due to improper adjustment of one of the retard resistances of the artificial line.

Figure 9 illustrates a circuit arrangement of the balance indicator employing full wave rectification.

Figures 10 and 11 are modified arrangements of the balance indicator employing a two-element and a three-element thermionic tube rectifier, respectively, and Figure 12 is a further modification of the balance indicator employing a thermionic amplifier for the unbalanced current.

Referring to Figure 1, I have shown a circuit arrangement representing a simple duplex telegraph system extending between two stations A and B, the apparatus at each station comprising two direct current generators G and $G^1$, each having a terminal connected to ground and poled, as shown, with the terminals of opposite polarity connected to the stationary contacts of a pole changing switch P, through resistances R and $R^1$, respectively. The tongue of the pole changing switch P is connected, through a manually operated switch S, having contacts 13 and 14 to the mid-point of the windings of a differential relay LR, the terminals of which are connected to the real line L and the artificial line AL, the latter of which is shown enclosed within the dotted rectangle.

A compensating resistance $R_1$, equivalent to the combined resistance of R and generator G, is connected to the switch contact 14 and to the ground.

The real line may be considered as composed of a number of series resistances RL and a number of distributed capacities C and leakage resistances RG in shunt to the earth. The artificial line AL is composed of a variable series resistance RA having, in shunt, the variable condensers $C^1$ and $C^2$ and $C^3$ each provided with variable retarding resistance $CR^1$, $CR^2$, and $CR^3$.

The out-of-balance indicating meter is connected directly across the real and artificial lines at the points 15 and 16. Theoretically when the artificial line is adjusted to exactly duplicate the real line both in phase and amplitude of the currents entering the real and artificial lines at any instant, there will be no difference of potential between the points 15 and 16. In actual practice, there is usually a difference of potential across the points 15 and 16 caused by interference currents. These interference currents may be due to inductance and electrostatic coupling with parallel lines or by direct leakage over cross arms.

As a result of these interference currents, the out-of-balance measuring instrument will always indicate a small current flow which may be considered the zero point of the instrument, for measuring the out-of-balance current. The value of this interference current may be directly determined by grounding the switch S at both stations A and B through the resistances $R_1$. The reading of the instrument connected across the points 15 and 16 indicates the magnitude of the interference currents, and the pointer of the instrument cannot be brought below this point regardless of the perfection of the balance. Having determined the minimum possible reading of the instrument, as limited by the interference currents, they need not be further considered, and in the subsequent explanation such interference currents will be disregarded.

In Figure 2 there is illustrated the wave form of a block signal which it is desired to transmit. The signal is distorted at the transmitting station, the amount of distortion depending, among other things, upon the value of the resistance of the transmitting apparatus and the capacity of the line, so that the wave shape of the signal as it enters the line may be of the general shape shown in Figure 3. As the artificial line is adjusted to simulate the real line in its electrical properties, the wave shape of the currents entering the real and artificial lines will be the same, and the oscillographic records obtained by inserting an oscillograph in the real and artificial lines, at the points 15 and 16, will be substantially identical. Corresponding points along the wave shape of the real line current will match those along the wave shape of the artificial line current.

If the artificial line does not exactly simulate the real line, more current will flow in one line than in the other, and a difference of potential will be produced across the points 15 and 16. This difference of potential and its accompanying wave shape may be represented by the difference between the wave shape of the current in the real line and that of the current in the artificial line, and may be obtained by placing an oscillograph between the points 15 and 16.

In Figure 4 I have shown a curve representing the oscillogram obtained when the line was correctly balanced, except that the condenser $C^1$ had too great a capacity. This curve represents the differences in the current flowing in the real line and artificial line under such conditions.

Figures 5 and 6 represent the out-of-balance current due to the improper adjustment of the condensers $C^2$ and $C^3$ respectively. It will be noted that the effect of condenser $C^1$ is more pronounced than that of either condenser $C^2$ or $C^4$, and that similarly the effect of condenser $C^2$ is more pronounced than that of condenser $C^3$. Condenser $C^1$ is therefore more critical in its adjustment than either condenser $C^2$ or $C^3$.

The curve of Figure 7 represents the combined effects of condensers $C^1$, $C^2$, and $C^3$ on the unbalanced current, and is the sum of the currents represented by the curves shown in Figures 4, 5 and 6. From this it will be noted that each of the condensers exerts its own individual effect upon the total unbalanced current independent of the adjustment of the other condensers.

Figure 8 represents the wave form of the unbalanced current due to improper adjustment of the retard resistance $CR^1$. Similar curves, only less abrupt in character, are obtained when the resistances $CR^2$ and $CR^3$ are out of adjustment.

It will be noted that the total out-of-balance current is composed of a number of currents of different frequencies, and that the balance indicating device placed across the points 15 and 16 must be capable of registering the effect of these higher frequencies which are several times above the fundamental frequency, particularly since it is these higher frequencies which produce the greatest distortive effect on the signals.

In accordance with my invention I provide a direct reading instrument which is capable of measuring out-of-balance current caused by either high or low frequencies.

Referring again to Figure 1, I have shown diagrammatically my balance indicator connected between the points 15 and 16 and consisting of a current rectifier 17, an electromagnetic or thermostatic meter or a galvanometer 18 connected in series therewith and an electric condenser 19 placed in shunt with the meter. The rectifier 17 may be of any suitable type such as a mineral crystal, two dissimilar metals, electrolytic, a thermionic tube or a gaseous conduction type rectifier.

With the arrangement shown, the out-of-balance current, which may have a wave shape somewhat similar to that of Figure 7, can pass to the meter 18 only in one direction, so that only every other reversal may pass through the meter. The condenser 19 receives a charge in proportion to the energy represented by the area of the impressed wave, and since the current can pass in only one direction between the points 15 and 16, the charge is trapped in the condenser and can only discharge through the meter 18. The operation of the indicator will be better understood when it is considered that when the high frequency components of the unbalanced current try to pass through the meter 18 they are opposed by the impedance of the instrument or absorbed by its inertia so that there is substantially no movement of the pointer in response thereto. The condenser 19, however, offers low impedance to the high frequency currents, and as the pulses of high frequency currents are in one direction only, due to the rectifier 17, the condenser will accumulate a charge.

The pulses of high frequency current tend to lose their shape or identity in the charging of the condenser and level down to a charge of uni-potential. The only escape for this charge is through the instrument 18, and the resultant discharge through the meter approaches direct current in form, particularly for the higher frequencies, so that a direct current measuring instrument 18 may be employed. The amount of charge accumulated on the condenser is a function of the voltage and the size of the condenser, so that the meter reading will be a direct indication of the degree of out-of-balance between the points 15 and 16, that is, between the real and artificial lines. By employing a meter having high inertia and high impedance, the pointer will be sufficiently steady to be easily read.

The procedure for balancing the real and artificial lines, with the above indicator is extremely simple, and may be readily accomplished in a fraction of a minute. If it is desired to balance the line at station A, the switch S at station B is connected to the ground through the resistance $R^1$, and the switch S at station A is placed on the contact 13. Direct current is then sent over the line by holding the tongue of the switch P against the particular contact which produces current of such polarity as to cause the maximum unbalanced current to flow through the meter.

The resistance RA of the artificial line is then adjusted to give the minimum meter reading on the balance indicator. This effects a balance of the series resistance of the artificial line with that of the real line. Alternating current is then transmitted over the line by allowing the pole changing switch P to oscillate between its contacts, the frequency of the current being substantially the same as that employed for transmitting signals. One of the condensers $C^1$, $C^2$ or $C^3$ is then adjusted either up or down until the meter reading is a minimum, after which each of the other condensers and the retard resistances $CR^1$, $CR^2$ and $CR^3$ are adjusted separately, each element of the artificial line being adjusted until the meter reading is a minimum for the adjustment of that particular element. The order in which the condensers and the retard resistances are adjusted is not material, since their effect on the total out-of-balance current is accumulative, and the adjustment of one does not appreciably disturb the adjustment of the others. It may be advisable, particularly if the line was far out of balance when the balance operation started, to rebalance the line by repeating the above operations.

In Figure 9 I have shown four rectifiers 20, 21, 22 and 23 disposed relative to the meter 18 and to the real and artificial lines so that full rectification of the out-of-balance current is obtained. The direction of the current through the rectifier from point 15 is through rectifier 20, meter 18 and rectifier 21, and the direction from point 16 is through rectifier 22, meter 18 and rectifier 23. The operation of the indicator is the same as that described in connection with Figure 1 except the current flows through the meter in one direction for either a positive or negative impulse.

In Figure 10 I have shown a two element thermionic tube rectifier 24 having the usual plate 25 and a thermionic cathode 26 heated by a local battery 27. If desired, a variable resistance 28 may be provided in series with the meter 18 for the double purpose of protecting the meter from excessive currents and for regulating the rate of discharge of the condenser 19 therethrough.

Figure 11 illustrates a method of employing a three-element tube rectifier, the operation being similar to that shown in Figure 10 except that the grid or control electrode 29 is given a biasing potential by connecting the same to the cathode battery through a resistance 30. The biasing of the grid, as is well understood in the art, serves to vary the plate resistance of the tube so as to increase or decrease the plate current.

In case it is desired to obtain a very fine balance, the out-of-balance current may not be of sufficient magnitude to satisfactorily operate the meter employed, and in such case it may be necessary to amplify the current reversals.

In Figure 12 I have shown a vacuum tube amplifier for this purpose having one stage of amplification, it being understood, of course, that as many stages of amplification may be employed as is necessary.

The amplifier is connected across the points 15 and 16 through stopping condensers 31 and 32 which serve to block out any direct current from the amplifier. The amplifier consists of the three element tubes 33 and 34 each having the usual cathode grid and plate. The alternating current voltages occuring between the points 15 and 16 are impressed upon the grid of the tube 33.

An inductance coil 35 is provided for each of these tubes between the cathode and the grid for preventing the grid circuit from being short-circuited to alternating current. The voltages variations control the output of the tube 33 in the usual manner and the output circuit of the tube 33 is coupled to the tube 34 by the resistance 36 and stopping condenser 37, although it is to be understood that impedance coupled amplification may be employed if desired. The voltage variations on the plate of the tube 33 are impressed on the tube 34 and control the output thereof in accordance with the voltage changes of the out-of-balance current.

The balance indicator is connected through the stopping condenser 38 across the resistance 39 in the output circuit of the tube 34 so as to be responsive to the output current. The operation of the indicator is the same as that described in connection with Figure 1.

It will be noted that I have provided an indicating means by which the degree of out-of-balance of the real and artificial lines may be determined by a direct reading meter, the readings of which provide an accurate and positive guide for the adjustment for each of the individual elements of the artificial line, irrespective of the complex nature of the transmitted signals, and which eliminates the use of complex and expensive measuring instruments, the readings of which are difficult to interpret. With the balancing means herein described, it is possible to quickly balance a line as often as weather conditions require without appreciably interrupting the telegraph service, and moreover it permits much closer simulation of the real and artificial lines to be obtained.

It is of extreme value in high speed duplex telegraph systems wherein the balance must be closely maintained to prevent improper operation of the automatic printing units.

It is possible, in certain telegraph lines, where the high frequency components exert less distorting effect upon the signals, or where a less accurate balance is satisfactory for the service, for which the line is used, to omit the condenser 19, and, if desired, a protective resistance may be inserted between the line and the balance indicator.

In Figure 9 I have shown a variable resistance 40 for this purpose. The resistance serves, also, to increase the sensitivity of the indicator.

While the balance indicator has been described with particular reference to the balancing of a duplex telegraph line, it is to be understood that it is not so limited, but may be employed for indicating the degree of balance existing between any two electrical circuits, regardless of the wave shape or frequency of the currents flowing therein.

What is claimed is:

1. A balance indicator for electrical circuits comprising a direct current meter, a rectifier in series with said meter and means responsive to the out-of-balance current delivered by said rectifier for producing a substantially uni-potential current flow through said meter.

2. A balance indicator for electrical circuits comprising a direct current meter, a rectifier in series with said meter and means in shunt to the meter responsive to the out-of-balance current delivered by the rectifier for producing a substantially uni-potential current flow through said meter.

3. A balance indicator for a duplex telegraph system comprising a direct current meter, a rectifier in series with said meter and means for leveling down the variable voltage components of the out-of-balance current transmitted through said rectifier to a substantially uni-potential current and delivering the same to said meter.

4. A balance indicator for a duplex telegraph system comprising a direct current meter, a rectifier in series with said meter and capacity means for receiving the high frequency component of the out-of-balance current and converting the same into a substantially uni-potential current and impressing the same on said meter.

5. A balance indicator for electrical circuits comprising a direct current meter, a rectifier in series with said meter and means intermediate the rectifier and meter for receiving the variable voltage components of the out-of-balance current, converting them into a substantially uni-potential current and delivering the same at a predetermined rate to said meter.

6. A balance indicator for a duplex telegraph system comprising a direct current meter, a rectifier in series with said meter and a condenser in shunt to the meter for receiving the variable voltage high frequency components of the out-of-balance current, converting them into a substantially uni-potential current and delivering the same to said meter.

7. A balance indicator for a duplex telegraph system comprising a direct current meter, a rectifier in series with said meter and capacity means for receiving the high frequency components of the out-of-balance current and converting them into a substantially uni-potentially direct current, and means for delivering said direct current to the meter at a predetermined rate.

8. A balance indicator for a duplex telegraph system comprising a direct current meter, a rectifier in series with said meter and a condenser in shunt thereto.

9. A balance indicator for a duplex telegraph system comprising a direct current meter, a rectifier in series with said meter and a condenser in shunt thereto and means for controlling the rate of discharge of said condenser.

10. A balance indicator for determining the out-of-balance current of a duplex telegraph system employing signals of changing polarity comprising a meter, rectifying means for delivering the out-of-balance current of both polarities to said meter, as uni-directional current and means for converting the variable voltage components of the out-of-balance current into substantially uni-potential current and delivering the uni-potential, uni-directional current to said meter.

11. A balance indicator for determining the out-of-balance current of a duplex telegraph system employing signals of changing polarity comprising a meter, rectifying means for delivering out-of-balance current of both polarities to said meter as uni-directional current and a condenser connected in shunt to said meter for converting the variable voltage components of the out-of-balance current into substantially uni-potential, uni-directional current.

12. A balance indicator for determining the out-of-balance current of a duplex telegraph system employing signals of changing polarity comprising means for rectifying said out-of-balance current, means for amplifying the same, means for converting the variable voltage components thereof into substantially uni-potential current and means responsive to said uni-potential rectified current for indicating the degree of out-of-balance of the system.

13. In a duplex telegraph system having a real and artificial line, the latter being composed of several variable resistance and capacity elements, the method of balancing the real and artificial lines comprising passing the out-of-balance current across the real and artificial lines in one direction only, converting the variable voltage components thereof into a substantially uni-potential current measuring the uni-potential, uni-directional current, and adjusting each element of the artificial line separately until a minimum current flows across the real and artificial lines for the particular element being adjusted.

14. In a duplex telegraph system having a real and artificial line, the latter being composed of several variable resistance and capacity elements, the method of balancing the real and artificial lines comprising converting the variable voltage, alternating, out-of-balance current into substantially uni-potential direct current, measuring said current and adjusting each element of the artificial lines separately until said current is a minimum for the particular element being adjusted.

15. In a duplex telegraph system having a real and artificial line, the latter being composed of a variable series resistance and a number of variable condensers in shunt thereto, the method of balancing the real and artificial lines comprising transmitting direct current over the line, measuring the current flow across the real and artificial lines, adjusting the series resistance until said current flow is a minimum and subsequently transmitting current of changing polarity over the line, converting the variable voltage, changing polarity, out-of-balance current across the real and artificial lines into substantially uni-potential, uni-directional current and adjusting each of the condensers separately until the out-of-balance current is a minimum for the particular condenser being adjusted.

16. In a duplex telegraph system having a real and artificial line, the method of determining the degree of balance of said real and artificial lines, comprising passing the out-of-balance current across the real and artificial lines in one direction only, converting the variable voltage components thereof into substantially uni-potential current and measuring the uni-potential, uni-directional current.

17. A balance indicator for a pair of electrical circuits subject to impressed potentials of the same value and frequency, comprising a measuring instrument connected between said circuits and a rectifier in series with said instrument.

18. A balance indicator for determining the out-of-balance current of a duplex telegraph system employing signals of changing polarity, comprising a meter and rectifying means disposed so as to deliver the out-of-balance current of both polarities, to said meter, as uni-directional current.

In testimony whereof I affix my signature.

WILLIAM G. FLUHARTY.